(12) United States Patent
Toyooka et al.

(10) Patent No.: US 8,591,738 B2
(45) Date of Patent: Nov. 26, 2013

(54) MEMBRANE UNIT AND MEMBRANE SEPARATION DEVICE

(75) Inventors: Kazuhiro Toyooka, Yokohama (JP); Hiroshi Noguchi, Tokyo (JP); Shigeo Sato, Kiyose (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 13/641,944

(22) PCT Filed: Mar. 25, 2011

(86) PCT No.: PCT/JP2011/057275
§ 371 (c)(1), (2), (4) Date: Oct. 18, 2012

(87) PCT Pub. No.: WO2011/132497
PCT Pub. Date: Oct. 27, 2011

(65) Prior Publication Data
US 2013/0032526 A1    Feb. 7, 2013

(30) Foreign Application Priority Data

Apr. 19, 2010    (JP) .................................. 2010-095787

(51) Int. Cl.
*B01D 65/02*    (2006.01)

(52) U.S. Cl.
USPC ................ 210/321.69; 210/221.2; 210/416.1; 210/636

(58) Field of Classification Search
USPC ............ 210/636, 151, 321.6, 321.64, 321.69, 210/321.84, 620, 791, 797, 150, 220, 221.2, 210/407, 408, 410, 411, 242.2; 261/1, 22, 261/86, 109, 114.2, 120
See application file for complete search history.

(56) References Cited

U.S. PATENT DOCUMENTS

2009/0127188 A1*    5/2009    Yamasaki et al. ............. 210/605

FOREIGN PATENT DOCUMENTS

| JP | 8-281080 A | 10/1996 |
|---|---|---|
| JP | 10-192667 A | 7/1998 |
| JP | 2001-162141 A | 6/2001 |
| JP | 2002-224685 A | 8/2002 |
| JP | 2003-53368 A | 2/2003 |
| JP | 2003-71255 A | 3/2003 |
| JP | 2009-119354 A | 6/2009 |
| JP | 2009-233622 A | 10/2009 |

OTHER PUBLICATIONS

English language machine translation of JP 2001-162141.*
Taichi Uesaka et al., Kubota Submerged Membrane Unit Applied for Upgrading of Wastewater Treatment and Water Re-use, Kubota Technical Report, 2005, pp. 42-50, No. 39.

* cited by examiner

*Primary Examiner* — David C Mellon
*Assistant Examiner* — Pranav Patel
(74) *Attorney, Agent, or Firm* — Foley & Lardner LLP

(57) ABSTRACT

In a membrane separation apparatus, a cleaning effect for membrane elements by scrubbing is improved. In the membrane separation apparatus 14 including a separation membrane 5 (membrane element) dipped in treated liquid in a treatment bath 15, and air diffusing means 2 for diffusing air bubbles 6 for cleaning the separation membrane 5, an air bubbles staying plate 3 is provided between the air diffusing means 2 and the separation membrane 5. The air bubbles staying plate 3 is configured to allow air bubbles 6 diffused from the air diffusing device 2 to stay, by which air bubbles 6 gather each other to form air bubbles 6 having large diameters. By causing air bubbles having large diameters to act on the separation membrane 5, air bubbles 6 can be allowed to act whole the separation membrane 5.

8 Claims, 7 Drawing Sheets

(a)  (b)  (c)

(d)  (e)  (f)

MEMBRANE UNIT AND MEMBRANE SEPARATION DEVICE

TECHNICAL FIELD

This invention relates to a membrane separation apparatus, and particularly to a membrane unit and a membrane separation apparatus to be used in the field of water treatment.

BACKGROUND ART

Membrane separation techniques have been hitherto used for seawater desalination, water purification treatment, gas separation, hemocatharsis and the like, in which researches have been recently advanced to apply the membrane separation techniques to waste water from the viewpoint of environmental protection.

Hitherto, sand filtration, gravity sedimentation and the like have been carried out as processes for accomplishing solid-liquid separation of treated water high in turbidity, such as water purification treatment, sewage and waste water treatment, treatment of industrial waste water and the like. However, the solid-liquid separation by these processes have problems such as occurrence of a case where the water quality of obtained treated water becomes insufficient or of requiring a vast site for the solid-liquid separation.

As processes for solving these problems, a variety of studies have been made in recent years on a process for accomplishing the solid-liquid separation of treated water by using a membrane module provided with a separation membrane such as a precision filtration membrane, an ultrafiltration membrane or the like. With these processes, the filtration treatment for treated water is carried out by using a separation membrane, and therefore treated water high in water quality can be obtained (see, for example, Non-patent Citation 1).

In case of accomplishing the solid-liquid separation of treated water by using a separation membrane, clogging at a separation membrane surface with suspended matter proceeds with continuation of filtration treatment, thereby resulting in lowering in filtering flow rate or rising of a differential pressure across the membrane. In order to restore such a condition, as shown in FIG. 8, an air diffusing device 2 is disposed below a membrane module 23 to accomplish a process for peeling off the suspended matter at the separation membrane surface by shaking (scrubbing) the treated water at the surface of a separation membrane 5 upon making diffusion of air from the air diffusing device 2 (see, for example, Patent Citations 1 and 2). As a supply source for scrubbing air to the air diffusing device 2, a blower and a compressor is used.

In the membrane separation apparatus disclosed in Patent Citations 1 and 2, one air diffusing device 2 (diffuser pipe) is disposed for each separation membrane 5 in order to cause air bubbles 6 for scrubbing to act uniformly and sufficiently on whole the separation membrane 5. Further, in order to improve the dissolving efficiency of scrubbing air into treated water, the diameter of air bubbles is made small.

PRIOR ART CITATION

Patent Citation

Patent Citation 1: Japanese Patent Provisional Publication No. (Hei) 8-281080
Patent Citation 2: Japanese Patent Provisional Publication No. 2001-162141

Non-Patent Citation

Non-patent Citation 1: Taichi Kamisaka and 3 others, "Kubota Submerged Membrane Unit Applied for Upgrading of Wastewater Treatment and Water Re-use", Kubota technical report, Kubota Corporation, June 2005, Volume 39, pages 42-50.

DISCLOSURE OF THE INVENTION

Problems to be Solved by the Invention

However, a higher cleaning effect can be obtained in case that the diameter of air bubbles 6 for scrubbing is larger. In other words, if the diameter of air bubbles is made smaller, a high dissolving efficiency can be obtained: however, the dissolving efficiency is in the relationship of trade-off to the cleaning efficiency, and therefore the quantity of scrubbing air must be increased in order to improve the cleaning efficiency. As a result, a large energy is required for air blowing to the whole apparatus. Additionally, if the diameter of air bubbles 6 is made larger, the dissolving efficiency is lowered. Therefore, in order to obtain the same dissolving quantity, it is required to increase the air supply quantity of a supply source for supplying scrubbing air to the air diffusing device 2.

From the viewpoint of energy saving, it is required to suppress the air supply quantity, in which the quantity of air bubbles 6 released from the air diffusing device 2 is unavoidably decreased in case of producing air bubbles 6 having large diameters with a small air supply quantity. If the quantity of air bubbles 6 is decreased, it has become difficult to cause air bubbles 6 for scrubbing to act uniformly and sufficiently on whole the membrane elements.

Means for Solving Problems

In view of the above situation, the present invention has an object to provide a membrane separation unit and a membrane separation apparatus which contribute to improvements in cleaning effect for a membrane element under scrubbing.

Specifically, the membrane unit of the present invention is characterized by including a membrane element dipped in treated liquid in a treatment bath; air diffusing means disposed below the membrane element; and air bubbles gathering means for gathering air bubbles diffused from the air diffusing means, disposed between the membrane element and the air diffusing means.

Additionally, in the above membrane unit, the air bubbles gathering means includes a plurality of the air bubbles gathering means, the air bubbles gathering means being disposed in the multistage.

Additionally, in the above membrane unit, the size of the air bubbles gathering means disposed in the multistage becomes smaller as the air bubbles gathering means becomes far from the air diffusing means.

Additionally, a membrane separation apparatus for solving the above problems is characterized by including a treatment bath; a membrane element dipped in treated liquid in the treatment bath; oxygen supplying means for supplying oxygen into the treated liquid; air diffusing means disposed below the membrane element; and air bubbles gathering means for gathering air bubbles diffused from the air diffusing means, disposed between the membrane element and the air diffusing means.

MODE FOR CARRYING OUT THE INVENTION

A membrane unit and a membrane separation apparatus according to embodiments of the present invention will be discussed in detail with reference to FIGS. 1 to 7.

This invention relates to scrubbing for separation membranes provided to a membrane unit (membrane separation unit). The scrubbing means a process for removing attached matter at the surface of the separation membrane by shaking treated water at the surface of the separation membrane with flowing water containing rising air bubbles.

It is known that concerning air bubbles to be used for scrubbing, air bubbles having larger particle diameter are higher in cleaning effect for the separation membrane. Accordingly, the membrane unit and the membrane separation apparatus according to the present invention are provided with an air bubbles staying plate (or air bubbles gathering means) for providing air bubbles having large particle diameters to the separation membranes.

In explanation of an embodiment, the membrane separation apparatus of a system using a diaphragm separation activated sludge process (Membrane Bioreactor: MBR) in a sewage and waste water treatment facility is exemplified; however, the membrane separation unit and the membrane separation apparatus according to the present invention are not limited to this embodiment. In other words, the membrane unit and the membrane separation apparatus are applicable to cleaning of separation membranes in apparatuses which filter a variety of treated waters (the treated water is not limited to water and therefore may be organic solvent or the like).

Figure 1:
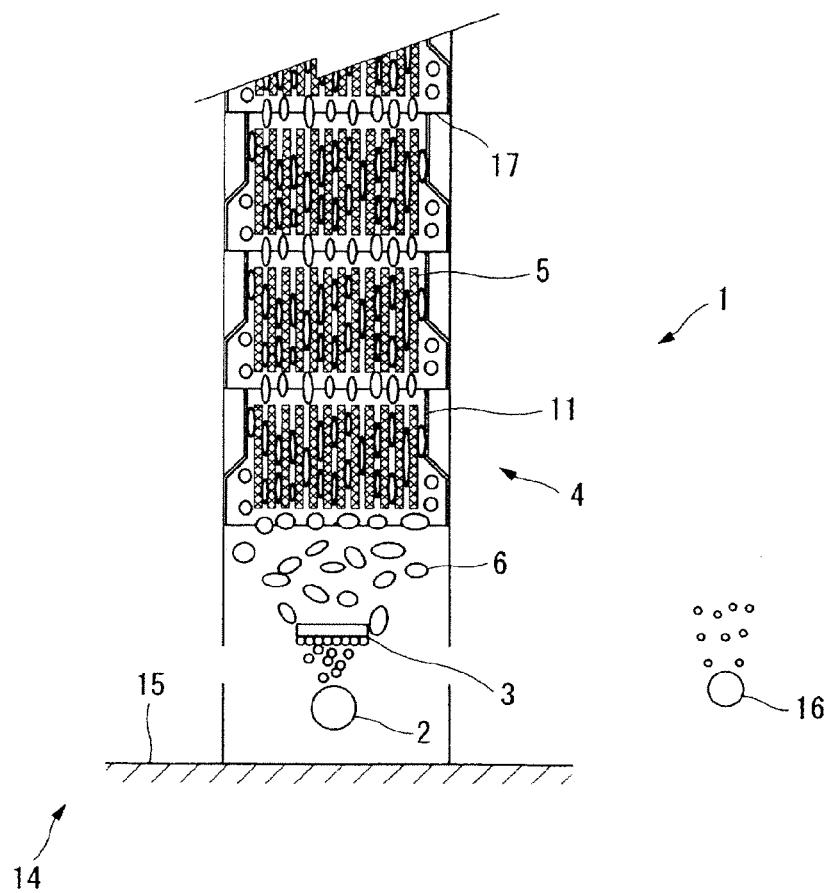
[FIG. 1] is a schematic sectional view showing an example of a membrane separation apparatus according to an embodiment 1 of the present invention.

As shown in FIG. 1, the membrane separation unit 1 according to an embodiment 1 of the present invention includes an air diffusing device 2, an air bubbles staying plate 3 (air bubbles gathering means), and a membrane module 4.

Figure 2:
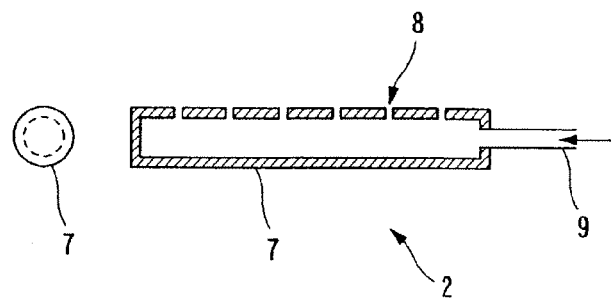
[FIG. 2] is a view showing an example of an air diffusing device according to the embodiment 1 of the present invention.
Figure 3:
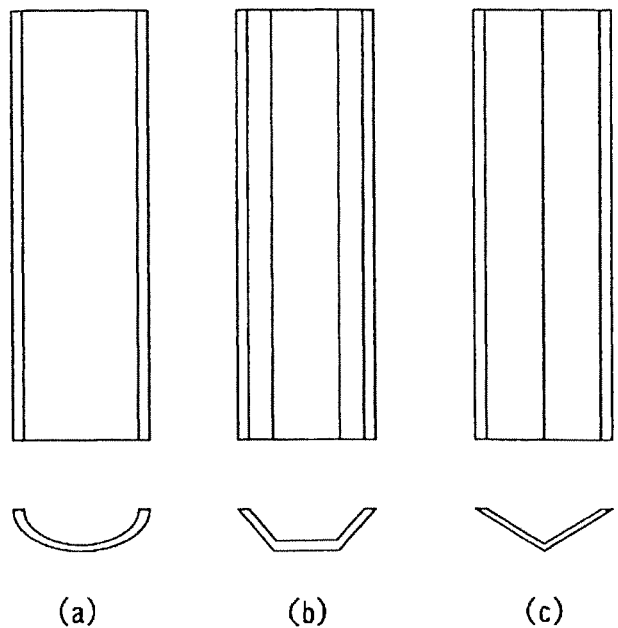
[FIG. 3] is a schematic view showing examples of air bubbles staying plates according to the embodiment 1 of the present invention.
Figure 3:
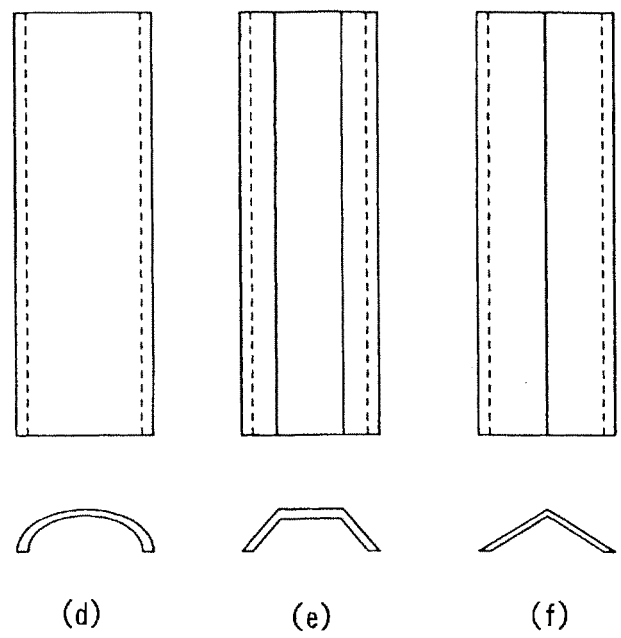

The air diffusing device 2 is disposed below the membrane module 4 and generates air bubbles 6 for cleaning (scrubbing) the separation membranes 5 disposed in the membrane module 4. As shown in FIG. 2, an example of the air diffusing device 2 includes a cylindrical member 7 formed of metal or plastic and formed with holes having a diameter of about 1 to 10 mm. An air inflow pipe 9 through which scrubbing air supplied from a blower or a compressor (not shown) flows into the cylindrical member 7 is connected to an end of the cylindrical member 7, in which scrubbing air flown into the cylindrical member 7 is ejected from the holes 8 thereby generating air bubbles 6.

The air bubbles staying plate 3 is provided between the air diffusing device 2 and the membrane module 4 and configured to allow air bubbles generated from the air diffusing device 2 to temporarily stay. Small air bubbles 6 are once gathered by the air bubbles staying plate 3 and combined with each other, thereby making it possible to send air bubbles 6 having large particle diameters to the membrane module 4.

The shape of the air bubbles staying plate 3 may be one which can produce air bubbles 6 having large particle diameters upon allowing air bubbles generated from the air diffusing device 2 to combine with each other. Accordingly, the air bubbles staying plate 3 may be in the shape of semicylinder, half-prism or the like as shown at (a) to (f) in FIG. 3 other than in the shape of flat plate as exemplified in FIG. 1, in which one of these shapes may suitably selected to be used, or some of these shapes may be used in combination. Additionally, the material of the air bubbles staying plate 3 is not particularly limited, in which the air bubbles staying plate is formed of metal, plastic, ceramic or the like. It is to be noted that a plurality of the air bubbles staying plates 3 may be provided. Additionally, the air bubbles staying plate 3 may be disposed parallel with or perpendicular to the membrane surface of the separation membrane 5.

Figure 4:
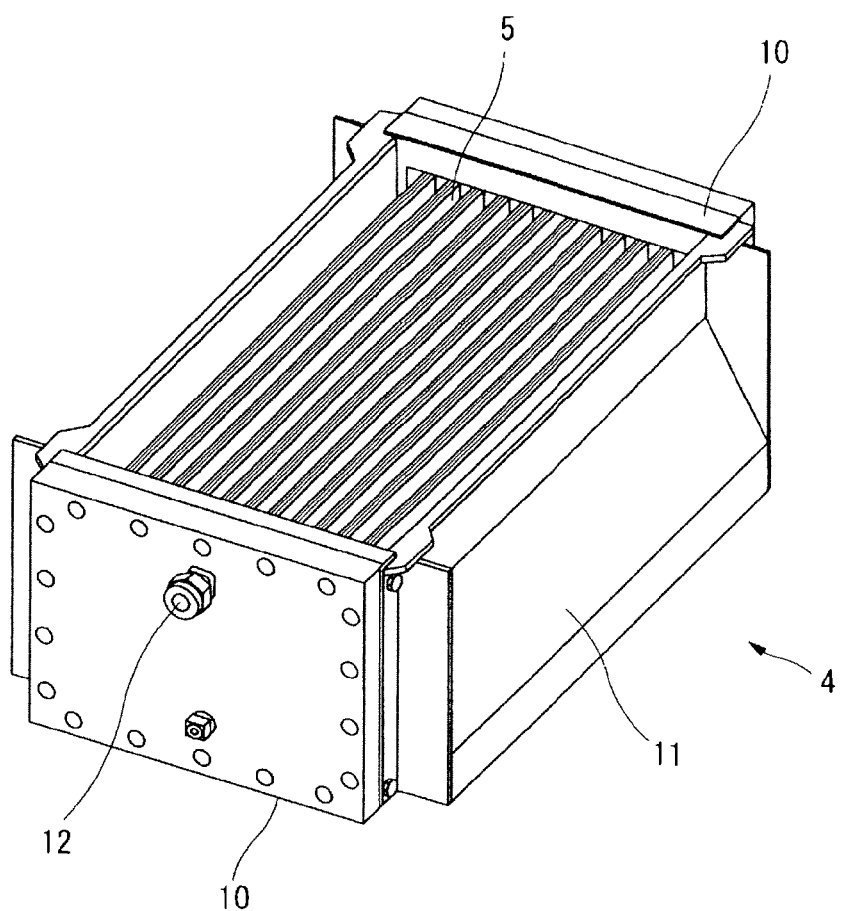
[FIG. 4] is a perspective view of an example of a membrane module according to the embodiment 1 of the present invention.

For example, as shown in FIG. 4, the membrane module 4 includes a plurality of the flat separation membranes 5, support sections 10 for supporting the side end portions of each separation membrane 5, and guides 11 each of which connects the opposite side portions of the support sections 10 to close a space between the opposite side portions. In other words, a box-like body having opening sections located respectively at upper and lower sides is constituted with the support sections 10 and the guides 11.

At this time, if the guide 11 is formed such that the cross-sectional area of an upper open end is smaller than the cross-sectional area of a lower open end, the filtering efficiency of the separation membrane 5 is improved. In other words, when the membrane modules 4 are laid upon one another, a clearance 17 is formed between the upper open end of the membrane module 4 and the lower open end of the membrane module (not shown) laid upon the former membrane module 4, in which treated water existing around the outer peripheral section of the membrane module 4 flows through the clearance 17 into the membrane module 4 thereby preventing the concentration of treated water flowing through the inside of the membrane module 4 from rising.

The support section 10 is formed with a water collection section (not shown) communicated with water collection passages 5b formed in the separation membrane 5 as discussed after. The water collection section may be provided to one or both of the opposite end sections of the separation membranes 5. The water collection section is in communication with a filtering suction opening 12 formed in the support section 12. Further, the piping of a pump for sucking filtered liquid is connected to this filtering suction opening 12, though not shown.

The separation membranes 5 are disposed inside the membrane module 4 in such a manner that the membrane surface 5a of the separation membrane 5 is parallel with a direction in which treated water flowing through the membrane module 4 flows.

Figure 5:
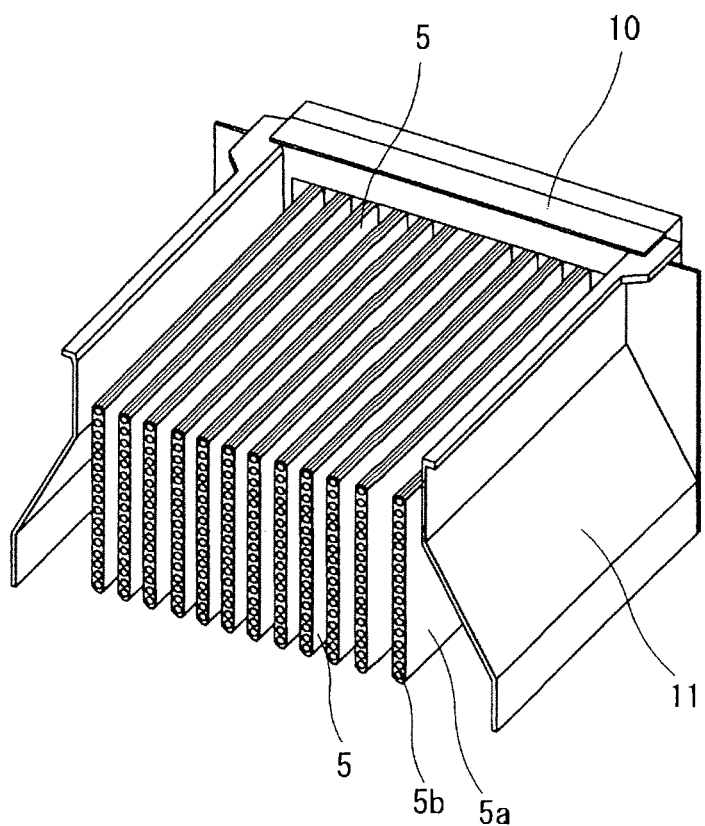
[FIG. 5] is a perspective view, partly in section, showing the example of the membrane module according to the embodiment 1 of the present invention.

FIG. 5 is a cross-sectional view of the membrane module 4. As an example of the separation membranes 5 provided in the membrane module 4, a ceramic flat membrane of a flat plate type, having a width of 100 to 200 mm, a length of 200 to 1000 mm and a thickness of 5 to 20 mm is shown. In general, the ceramic flat membrane is preferable because of being able to be produced by extrusion molding. In case of the extrusion molding, a suitable size of the ceramic planar plate may be decided taking account of producing machinery such as a metallic mold and the like and deformation and the like after extrusion of the ceramic flat membrane The separation membrane 5 is not limited to the embodiment, and is a known separation membrane applied to MBR, such as organic hollow fiber membrane, organic flat membrane, inorganic flat membrane, inorganic single-tube membrane and the like which may be used. Examples of the material of the separation membrane 5 include cellulose, polyolefin, polysulfone, PVDF (polyvinylidene fluoride), PTFE (polytetrafluoroethylene), ceramic and the like.

Additionally, the pore size of the separation membrane 5 is also not limited and therefore may be selected according to the particle diameters of substances as objects of the solid-liquid separation. For example, the pore size may be not larger than 0.5 μm if the separation membrane is used for the solid-liquid separation of activated sludge. Additionally, the pore size may be not larger than 0.1 μm in case that bacteria removal is required like filtration of purified water. In other words, the pore size may be a pore size (0.001 to 0.1 μm) which is generally formed in an ultrafiltration membrane or a pore size (0.1 to 1 μm) which is generally formed in a precision filtration membrane.

As shown in FIG. 5, as an example of the separation membrane 5, the separation membrane 5 is formed at its end section with a plurality of the water collection passages 5b.

The kind and disposition mode of the separation membrane 5 are decided totally taking account of a compactability of the membrane module 4, lowering in pressure loss when filtered liquid is taken out, easiness in processing during disposition of the membrane module 4, and the like.

In the membrane module 4 having the above configuration, solid matters and the like are caught by the surface of the separation membrane 5 at the membrane surface 5a of the separation membrane 5, and therefore water content is separated from the solid matters and the like. Filtered water from which solid matters and the like are thus removed reaches the water collection passages 5b, and then is transferred out of the bioreactor (out of the membrane separation apparatus 1) through the water collection sections communicated with the water collection passages 5b and the filtering suction opening 12.

The number of the separation membranes 5 provided in the membrane module 4 may be selected taking account of operationability and maintenability, and may be, for example, around 10 to 30.

As shown in FIG. 5, in order to put treated water flowing near all separation membranes 5 in the generally same conditions (concentrations and flow rates of treated water), the guides 11 are disposed opposite to each other. In this case, the guides 11 having the same height as that of the membrane module 4 may be disposed opposite to each other and respectively located at left and right sides of the membrane element groups as shown in FIG. 1; however, a plurality of guides 11 each of which is formed by being divided in a height direction of the membrane module 4 may be disposed in the height direction of the membrane module.

The shape of the guide 11 may be formed in the flow passage of the membrane module 4 in such a manner that the flow passage is narrowed in a part provided with the separation membranes 5. By narrowing the above-mentioned flow passage, the velocity of treated water flowing through the guide 11 and the separation modules 5 becomes high thereby improving the cleaning efficiency. Additionally, by narrowing the flow passage, gas-liquid mixture flow containing air bubbles can be converged thereby making it possible to effectively cause air bubbles to act on the membrane surface 5a of the separation membrane 5.

Additionally, as shown in FIG. 1, the membrane separation apparatus 14 according to the embodiment 1 of the present invention includes a bioreactor bath 15, the membrane separation unit 1, and a gas diffusing device 16 for supplying oxygen.

The membrane separation unit 1 is constituted by stacking the membrane modules 4 in the direction of depth of treated water and disposed to dip in the liquid phase inside the bioreactor bath 15 of MBR. By stacking the membrane modules 4, more air bubbles 6 generated from the air diffusing device 2 can act on the separation membranes 5. In other words, as the number of the stacked membrane modules 4 increases, the scrubbing effect to the air quantity diffused from the air diffusing device 2 increases.

Additionally, the cross-sectional area of the opening section of the membrane module 4 is small in the upper opening section and large in the lower opening section. As a result, in case that the membrane separation unit 1 is constituted by vertically stacking the membrane modules 4, by virtue of the guides 11, air bubbles 6 generated from the air diffusing device 2 is not diffused outside of the membrane separation unit 1 thereby making it possible to cause air bubbles 6 to effectively act on the separation membranes 5.

The gas diffusing device 16 for supplying oxygen is provided in the bioreactor bath 15 to supply oxygen required for bioreaction.

In general, the water depth of the bioreactor bath 15 is about 4 m. Therefore, the number of the stacked membrane modules 4 is selected taking account of the weight and outer shape considering the water depth and maintainability of the bioreactor bath 15. For example, the number of the membrane modules 4 is selected so that the height of the membrane separation unit 1 becomes about 2 m to about 3 m.

The flow of treated water inside this membrane separation unit is directed from the opening section at the lower side to the opening section at the upper side of the membrane separation unit 1. The flow passage of the membrane separation unit 1 is simply sealed off from outside treated water, and treated water is filtered by the separation membranes 5. Accordingly, the activated sludge concentration of treated water flowing inside the membrane separation unit 1 increases as a location in the membrane separation unit 1 become higher. In the membrane separation unit 1, treated water is sucked into the membrane separation unit 1 through the clearance 17 of each membrane module 4, and therefore a large increase in the activated sludge concentration inside the membrane separation unit 1 can be suppressed. As a result, a load to filtering is lowered thereby suppressing a membrane clogging and lowering an energy consumption. It is to be noted that a suction force for sucking treated water into the membrane separation unit 1 is generated under upward moving of air bubbles, so that it is not particularly required to provide a power source for sucking treated water.

Detailed discussion will be made on operation of the membrane separation apparatus 14 according to the embodiment of the present invention with reference to the membrane separation apparatus 14 used for MBR shown in FIG. 1. In MBR, the air diffusing device 2 is disposed below the separation membranes 5 in order to prevent the separation membranes 5 from clogging due to adherence and accumulation of fine foreign substances, extracellular polymers produced by micro-organisms, and the like on and in the separation membrane 4. Air diffusion from the air diffusing device 2 may be carried out always continuously at least in a process of filtering being made. An immersion suction filtration process or a gravitation filtration process under a water head difference is used as an operation method for the membrane separation apparatus 14.

In case of carrying out filtration, air is diffused from the air diffusing device 2 and the gas diffusing device 16 for supplying oxygen. By diffusing air from the air diffusing device 2, rising of air bubbles 6 in the liquid causes flow rate, turbulent flow and shearing force to act onto the surface layer of the separation membrane 5, thereby making it possible to clean the separation membrane 5. In other words, the gas-liquid mixture flow generated with air bubbles 6 released from the air diffusing device 2 rises and comes into contact with the separation membrane 5. With this gas-liquid mixture flow, scrubbing is made on each separation membrane 5. Additionally, oxygen dissolving into treated water is carried out by the gas diffusing device 16 for supplying oxygen.

Additionally, treated water is divided into solid content and water under the filtering function of the separation membrane 5. As shown in FIGS. 4 and 5, the water collection passage 5*b* of the separation membrane 5 is in communication with the filtering suction opening 12 through the water collection section (not shown), and the suction pump (not shown) is connected through the pining to the other end of the filtering suction opening 12. Accordingly, filtered water filtered through the separation membrane 5 is sucked by the suction pump and transferred to the outside of the membrane separation apparatus 14.

The particle diameter of air bubbles 6 to be supplied for cleaning of the separation membranes 5 is preferably larger than the distance between the separation membranes 5 thereby obtaining a high cleaning effect. For example, in case that the separation membranes 5 are arranged at intervals of 8.5 mm, the cleaning effect can be improved if air bubbles 6 including air bubbles 6 having a diameter of 10 mm or larger are cause to act on the separation membranes 5. In this regard, the air bubbles staying plate 3 of the membrane separation apparatus 14 according to this embodiment allows air bubbles 6 from the air diffusing device 2 to stay and to gather each other thereby forming air bubbles 6 having large particle diameters. Then, these air bubbles 6 having large particle diameters are supplied for cleaning of the separation membranes 5.

It has been experimentally known that air diffusing can be securely and stably accomplished if the flow velocity of air ejected from each hole 8 in the air diffusing device 2 shown in FIG. 2 is 10 m/sec. or higher, in connection with the action of pushing aside water (mixture liquid) inside the cylindrical member 7 or the like action. Additionally, the supplied-air flow rate of scrubbing air required for cleaning of the separation membranes 5 is decided according to a filtering flow rate of the membrane unit 1, so that the supplied-air flow rate of required scrubbing air becomes larger as the filtering flow rate becomes larger.

For example, in the membrane separation apparatus 14 as shown in FIG. 1, in case of setting that the filtering flow rate is at 15 m³/day; the supplied-air flow rate of scrubbing air is 6 times the filtering flow rate; and the air flow velocity of air ejected from each hole 8 is 15 m/sec., the number of the holes 8 becomes 10 if the diameter ϕ of each hole 8 is 3 mm. Additionally, the number of the holes 8 becomes 3 if the diameter ϕ of each hole 8 is 5 mm. In other words, larger air bubbles 6 are required to be produced in order to improve the cleaning effect of the separation membranes 5; however, if the diameters of the holes 8 are made large to produce large air bubbles 6, the number of the holes 8 is required to become small for the purpose of accomplish stable air diffusing. When the number of the holes 8 becomes small, it becomes difficult to cause air bubbles 6 to act generally uniformly on all the separation membranes 5. Accordingly, in a conventional membrane separation apparatus, the supplied-air flow rate of scrubbing air has been required to be 10 to 20 times the filtering flow rate.

In the membrane separation apparatus 14 according to this embodiment, the air bubbles staying plate 3 is disposed between the air diffusing device 2 and the membrane module 4, by which air bubbles 6 generated from the air diffusing device 2 gather each other so as to allow air bubbles 6 having large particle diameters to act on the separation membranes 5. Accordingly, the cleaning effect of the separation membranes 5 can be improved. Further, air bubbles 6 can be temporally and spatially averaged by the air bubbles staying plate 3, and therefore air bubbles 6 can be allowed to act uniformly and sufficiently on all the separation membranes 5. Accordingly, a sufficient cleaning effect can be obtained even though scrubbing is accomplished by the scrubbing air supplied-air flow rate about 6 times the filtering flow rate.

Additionally, the cleaning effect is high when the diameter of air bubbles 6 to be used for air diffusing is large, and the dissolving efficiency is improved when the diameter of air bubbles 6 to be used for dissolving gas into treated water is small. Accordingly, the air diffusing device 2 for scrubbing and the gas diffusing device 16 for bioreaction are designed to be disposed separate from each other, thereby making it possible to reduce the energy consumption for a blower or a compressor to be used for the air diffusing device 2 or the like.

Next, the membrane unit 18 and the membrane separation apparatus 19 according to an embodiment 2 of the present invention will be discussed in detail with reference to FIGS. 6 and 7.

The invention according to the embodiment 2 of the present invention relates to a disposing method for air bubbles staying plates 3 provided to the membrane unit 18 and the membrane separation apparatus 19. Accordingly, the respective constituting elements for constituting the membrane unit 18 and the membrane separation apparatus 19 are the same as those in the membrane unit 1 and the membrane separation unit 14 according to the embodiment 1. Hence, the same reference numerals are assigned to the same elements as those in the embodiment 1 thereby omitting the detailed explanation thereof. Additionally, also operation of the membrane separation apparatus 19 is the same as that in the explanation of the membrane separation apparatus 14 of the embodiment 1.

Figure 6:
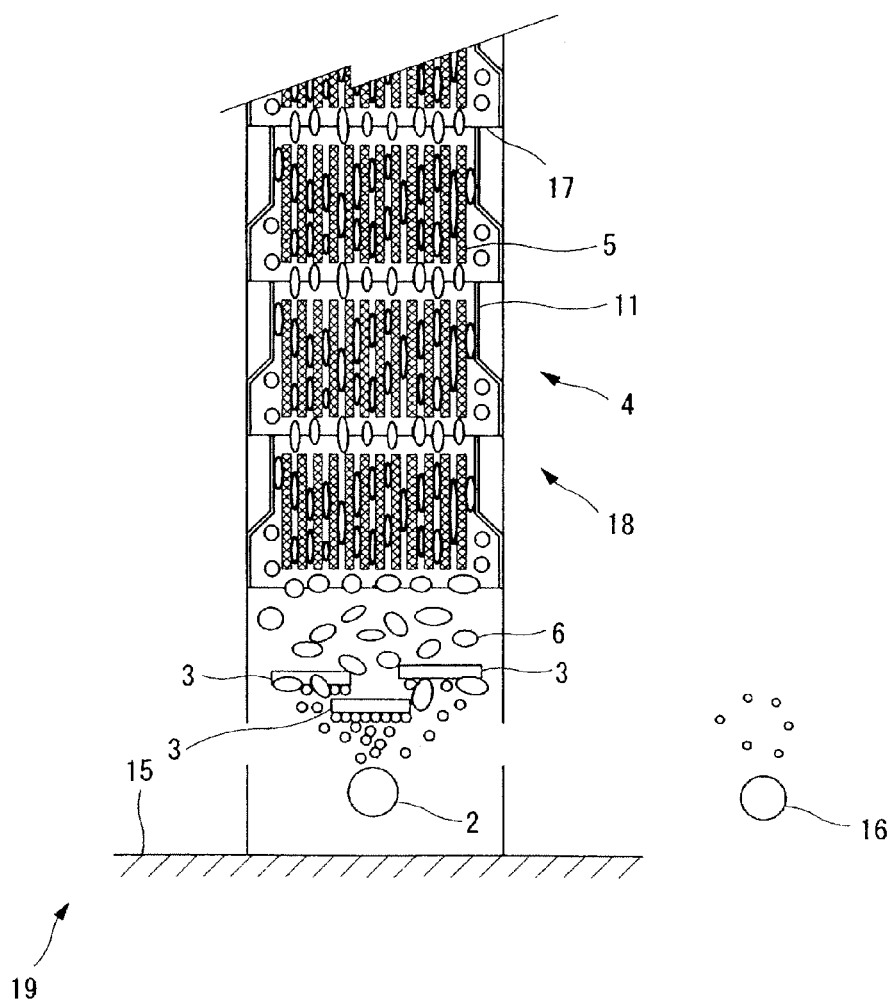
[FIG. 6] is a schematic view showing an example of the membrane separation apparatus according to an embodiment 2 of the present invention.
Figure 7:
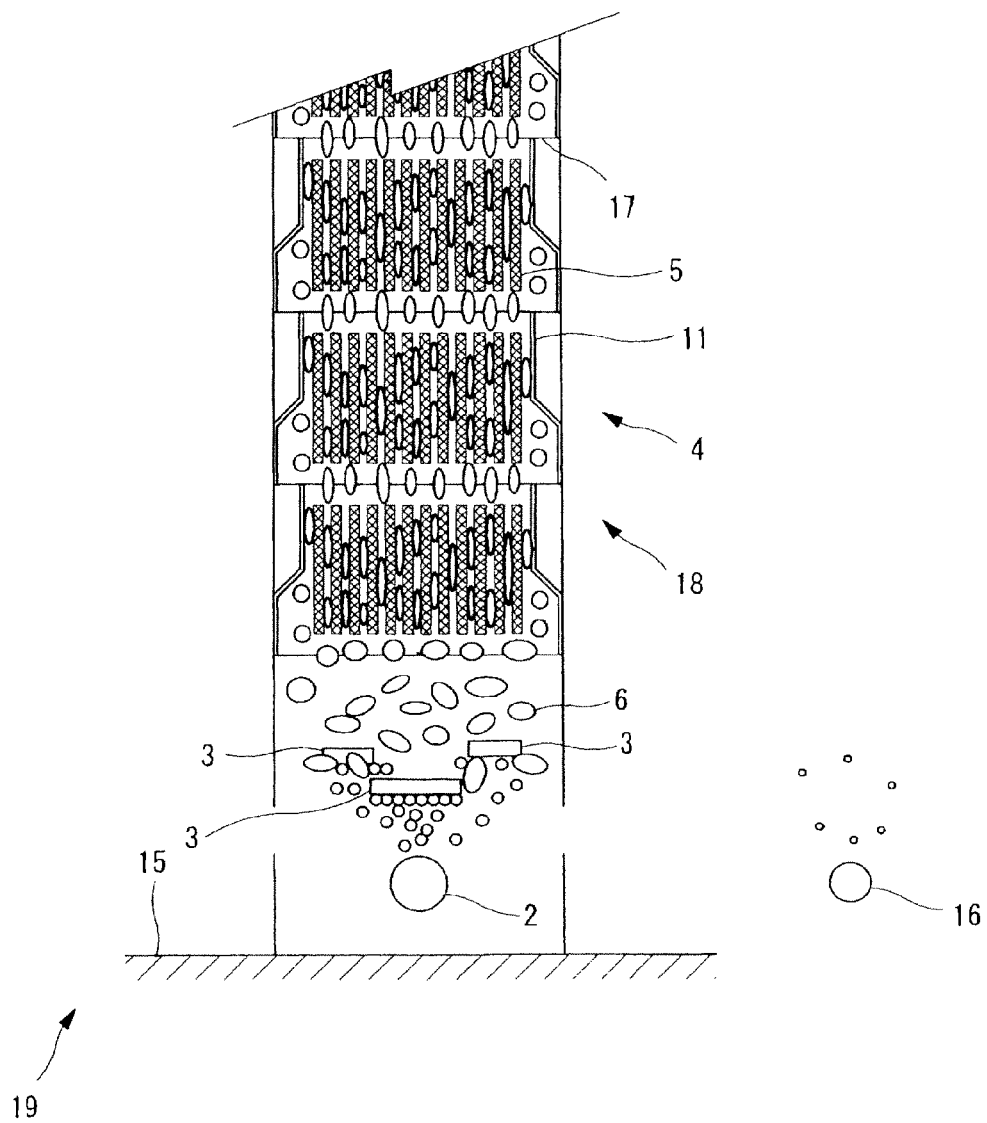
[FIG. 7] is a schematic view of a modified example of the membrane separation apparatus according to the embodiment 2 of the present invention.
Figure 8:
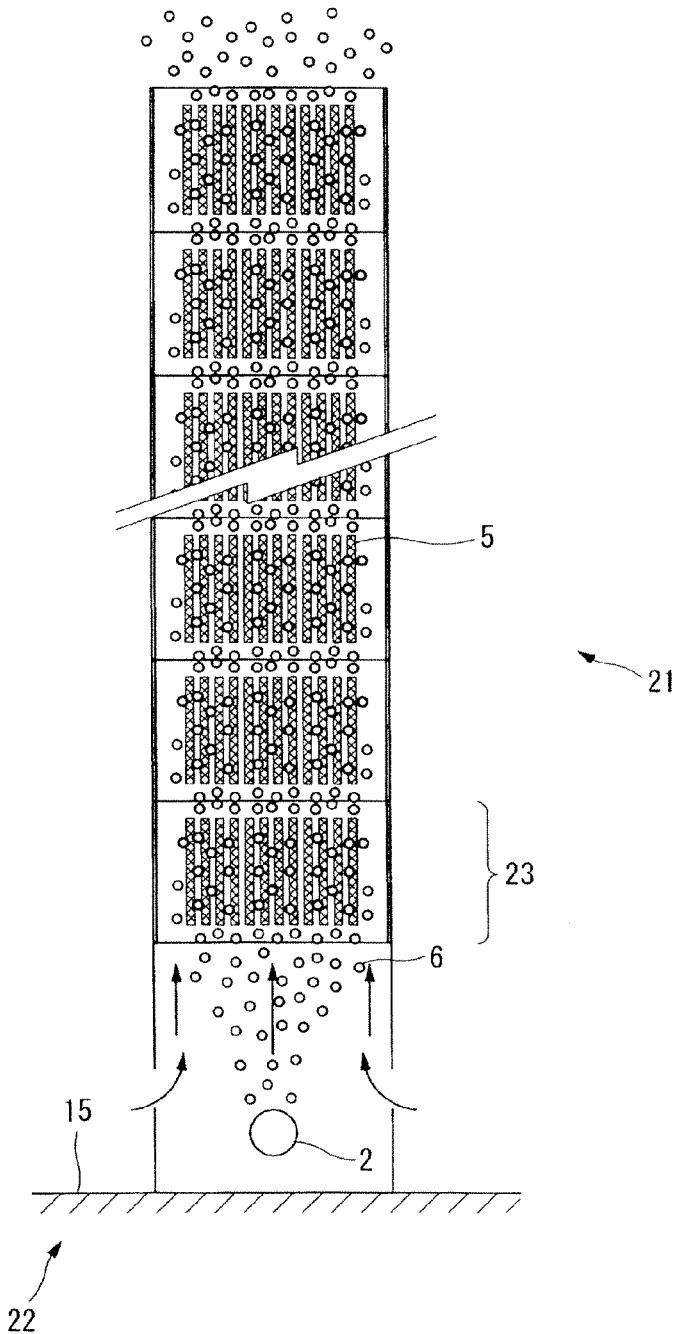
[FIG. 8] is a schematic sectional view showing an example of a membrane separation apparatus according to a conventional technique.

As shown in FIG. 6, the membrane separation unit 18 according to the embodiment 2 of the present invention includes an air diffusing device 2, an air bubbles staying plates 3 (air bubbles gathering means), and a membrane module 4.

In the membrane separation unit 18 according to the embodiment 2, the air bubbles staying plates 3 are disposed in the multistage. By disposing the air bubbles staying plates 3 in the multistage, air bubbles 6 can be spatially dispersed in addition to obtaining the effects of the membrane unit 1 and the membrane separation apparatus 14. Additionally, as shown in FIG. 7, by adjusting the width of the air bubbles staying plate 3 disposed in the multistage (for example, by reducing the width of the air bubbles staying plates 3 as the location of the air bubbles staying plates 3 becomes far from the air diffusing device 2), adjustment can be accomplished such that air bubbles 6 can act all the separation membranes 5. Further, also in case that one air diffusing device 2 is used for each membrane unit, air bubbles 6 can act on all the separation membranes 5 thereby preventing phenomena in which ejection air quantities from a plurality of branch devices become ununiform upon configuring the air bubbles diffusing device 2 to diverge into the plurality of the branch devices.

As discussed above, according to the membrane unit and the membrane separation apparatus of the present invention, air bubbles having large diameters can be allowed to act on the membrane elements, and therefore a high cleaning effect can be obtained even if the quantity of air ejected from the air diffusing device is made small. Additionally, by providing a plurality of the air bubbles staying plates in the multistage, air bubbles to be supplied to each membrane element can be allowed to temporally and spatially uniformly act. By the air bubbles staying means, air bubbles can become spatially uniform, and therefore the number of the air diffusing devices (or the branch devices from the air diffusing device) can be suppressed small thus preventing air bubbles from becoming ununiform due to clogging of the air diffusing device.

In other words, reduction of energy for operating the membrane separation apparatus and extension in maintenance interval for the membrane separation apparatus can be achieved.

EXPLANATION OF REFERENCE NUMERALS

1 . . . membrane separation unit (membrane unit)
2 . . . air diffusing device (air diffusing means)
3 . . . air bubbles staying plate (air bubbles gathering means)
4 . . . membrane module
5 . . . separation membrane (membrane element)
5a . . . membrane surface
5b . . . water collection passage
6 . . . air bubbles
10 . . . support section
11 . . . guide
12 . . . filtering suction opening
17 . . . clearance
14 . . . membrane separation apparatus
15 . . . bioreactor bath (treatment bath)
16 . . . gas diffusion device for supplying oxygen (oxygen supplying means)

The invention claimed is:

1. A membrane unit comprising:
a membrane element dipped in treated liquid in a treatment bath;
air diffusing means disposed below the membrane element; and
a plurality of air bubbles gathering means for gathering air bubbles diffused from the air diffusing means, disposed between the membrane element and the air diffusing means,
wherein the plurality of air bubbles gathering means are disposed in multiple stages in a direction perpendicular to a membrane surface of the membrane element, and
wherein each of the plurality of air bubbles gathering means disposed in multiple stages has a size in the direction perpendicular to the membrane surface of the membrane element, the size becoming smaller as each of the plurality of air bubbles gathering means becomes far from the air diffusing means.

2. The membrane unit of claim 1, wherein the membrane element comprises material selected from the group consisting of cellulose, polyolefin, polysulfone, polyvinylidene fluoride, polytetrafluoroethylene and ceramic.

3. The membrane unit of claim 1, wherein each of the plurality of air bubbles gathering means is formed in a shape of a semicylinder, a half-prism, or a flat plate.

4. A sewage and waste water treatment facility comprising the membrane unit of claim 1.

5. A membrane separation apparatus comprising:
a treatment bath;
a membrane element dipped in treated liquid in the treatment bath;
oxygen supplying means for supplying oxygen into the treated liquid;
air diffusing means disposed below the membrane element; and
a plurality of air bubbles gathering means for gathering air bubbles diffused from the air diffusing means, disposed between the membrane element and the air diffusing means,
wherein the plurality of air bubbles gathering means are disposed in multiple stages in a direction perpendicular to a membrane surface of the membrane element, and
wherein each of the plurality of air bubbles gathering means disposed in multiple stages has a size in the direction perpendicular to the membrane surface of the membrane element, the size becoming smaller as each of the plurality of air bubbles gathering means becomes far from the air diffusing means.

6. The membrane separation apparatus of claim 5, wherein the membrane element comprises material selected from the group consisting of cellulose, polyolefin, polysulfone, polyvinylidene fluoride, polytetrafluoroethylene and ceramic.

7. A sewage and waste water treatment facility comprising the membrane separation apparatus of claim 5.

8. A membrane unit comprising:
a membrane element dipped in treated liquid in a treatment bath,
an air diffusing device disposed below the membrane element, and
a plurality of air bubbles plates configured to gather air bubbles diffused from the air diffusing device, disposed between the membrane element and the air diffusing device,
wherein the plurality of air bubbles plates are disposed in multiple stages, and
wherein each of the plurality of air bubbles plates disposed in multiple stages has a width, the width becoming smaller as each of the plurality of air bubbles plates becomes far from the air diffusing device.

* * * * *